(12) United States Patent
Prusia (10) Patent No.: US 8,059,893 B2
(45) Date of Patent: Nov. 15, 2011

(54) METHOD FOR SINGLE PASS BLOB IMAGE ANALYSIS

(75) Inventor: Ronald Norman Prusia, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1057 days.

(21) Appl. No.: 11/828,150

(22) Filed: Jul. 25, 2007

(65) Prior Publication Data

US 2009/0208104 A1    Aug. 20, 2009

(51) Int. Cl.
*G06K 9/34* (2006.01)

(52) U.S. Cl. ........ 382/173; 382/204; 382/224; 382/109; 382/103; 463/36; 463/30; 463/31; 463/34

(58) Field of Classification Search ............... 382/204, 382/173, 224, 109, 164, 103; 406/36, 30, 406/31, 34
See application file for complete search history.

(56) References Cited

U.S. PATENT DOCUMENTS

| 5,216,506 A * | 6/1993 | Airoldi et al. ............... 348/720 |
| 7,379,587 B2 * | 5/2008 | Curry et al. .................. 382/164 |
| 7,775,883 B2 * | 8/2010 | Smoot et al. .................... 463/36 |
| 2005/0104958 A1 * | 5/2005 | Egnal et al. .................. 348/143 |
| 2006/0067562 A1 * | 3/2006 | Kamath et al. ............... 382/103 |
| 2009/0087096 A1 * | 4/2009 | Eaton et al. ................... 382/190 |

* cited by examiner

*Primary Examiner* — Brian Q Le
*Assistant Examiner* — Mekonen Bekele
(74) *Attorney, Agent, or Firm* — Christoper L. Blackburn; David S. Kalmbaugh (57) ABSTRACT

A method and electronics circuit for processing very high resolution images or very high frame rate images in real time. Each pixel within a frame of pixels is compared to the neighboring pixels within the frame to determine if the pixel is part of a blob group. If the pixel is part of the blob group, the characteristics of the pixel are added to the statistics for the blob group. When a pixel overlaps two target blob groups, the two blob groups are combined to form one blob group. When the end of the frame is reached information about the blob groups in the frame is made available.

19 Claims, 6 Drawing Sheets

METHOD FOR SINGLE PASS BLOB IMAGE ANALYSIS

This application includes a Computer Program Listing Appendix which is incorporated by reference into the application. The Computer Program Listing Appendix consist of the file ComputerProgramListingAppendix.txt, which was created on Jul. 23, 2007 and is forty one kilo-bytes in size.

BACKGROUND OF THE INVENTION

1. Field of the Invention

The present invention relates generally to image processing. More specifically, the present invention relates to a method and apparatus for processing very high resolution images or very high frame rate images in real time.

2. Description of the Prior Art

A blob (binary large object) is an area of touching pixels with the same logic state. All pixels in an image that belong to a blob are in a foreground state. The remaining pixels in the image are in a background state. In a binary image, pixels in the background have values equal to zero, while every non-zero pixel is part of a binary image. Blob analysis is typically used to detect blobs in an image and make selected measurements of these blobs within the image. Blob analysis consist of a series of processing operations and analysis functions that produce information about 2-dimensional shape in an image.

Image processing generates large quantities of data at very high bandwidths. Currently, it is very difficult to process this data in real time using conventional data processing techniques.

Blob analysis is performed on images using recursive algorithms. This requires the algorithm used for blob analysis to make multiple passes through the image. When multiple passes are required, the whole video frame must be stored in memory. The memory requirements and multiple passes make it difficult to perform the task in real time.

SUMMARY OF THE INVENTION

The present invention overcomes some of the disadvantages of the past including those mentioned above in that it comprises a highly effective and efficient to a method and apparatus for processing very high resolution images or very high frame rate images in real time. This processing is accomplished in a single pass of the video frame.

The method of the present invention first determines if pixel intensity for a pixel is within preset thresholds. When the pixel being processed is within the preset thresholds, the pixel is tagged as a blob pixel, which indicates the present of a target. Pixels are processed by a blob controller in increments of five pixels where three of the pixels are from the previous line of pixel data and two pixels are from the present line of pixel data being processed.

When a pixel overlaps two blob pixel groups, the blob pixel groups are combined into one pixel group. The statistics for both blob groups as combined and pixel information for one of the two blob groups is zeroed to indicate that the blob group is no longer valid.

Memory pointers provided by a memory pointers module are used to point to updated track files as the track files or blob groups are combined. The memory pointers are only used to cover combined blob groups.

When a blob was previously combined with another blob, the memory pointers will return the combined blob address. Each memory pointer contains the original blob address and a new pointer address for the combined blob groups.

When an update command is generated by the blob controller, if there is not a pointer for the combined blob address a new pointer is created. For subsequent blob combinations when there is an existing pointer the pointer module will update the pointer to a new blob address.

When there are no more current target pixels to be processed, the pixel data is written from a blob statistics module into a statistics memory. The blob statistics module keeps track of pertinent information for each target blob group.

For each line of a frame the first and last pixels for each blob group are flagged and written to a last line memory.

DETAILED DESCRIPTION OF A PREFERRED EMBODIMENT

Figure 1:
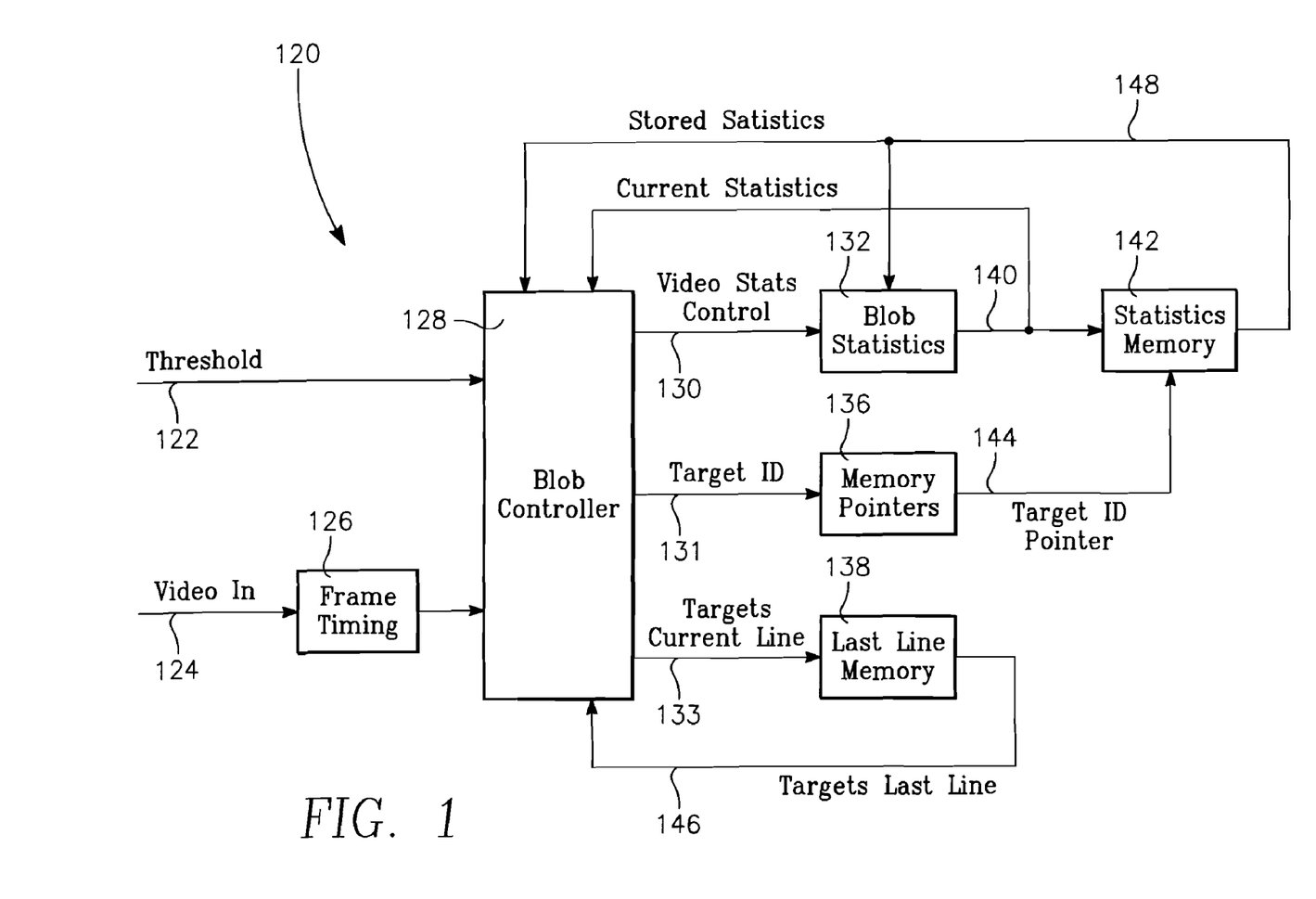
FIG. 1 is a block diagram of the apparatus for apparatus for single pass blob image analysis comprising the present invention.

Referring to FIG. 1, there is shown a block diagram of the apparatus/electronics circuit 120 for blob image analysis in real time which comprises the present invention. Blob image analysis apparatus 120 consist of six major functional blocks illustrated in FIG. 1. The six major functional components are a frame timing module 126, a blob controller 128, blob statistics module 132, memory pointers module 136, a last line memory 138 and a statistics memory 142.

The frame timing module 126 comprises the video timing software for circuit 120, which creates the timing signals for circuit 120. This, in turn, provides for two dimensional processing which is required to generate tracking files in real time. Specifically frame timing module 126 defines pixel location within the frame being analyzed. The frame timing module 126 also provides signals which indicate the end of a line and the end of a frame of pixel data. The pixel data being processed is in the form of a raster scan comprising a frame of pixel data. The frame size used in the present invention is 20 by 20, with a target resolution of 640 by 480, although the present invention is compatible with any frame size.

The blob controller 128 operates as a controller for circuit 120 which uses pipelining of video data to perform signal processing. This is required to compensate for the synchronous behavior of statistics memory 142, providing a means for examination of multiple pixels during each line.

Each pixel of an image is compared to its neighboring pixels to determine if it is a part of a particular blob group. If the pixel is part of a particular group the characteristics of the pixels are added to that particular blob group. If the pixel overlaps multiple target blobs, the two blobs are combined into one group. When the end of a frame is reached all blob information is available. Memory 142 can be initialized to zero, while pixel data is being read out from memory 142.

The blob statistics module 132 keeps track of pertinent information for each blob group.

The blob statistics 132 holds all of the statistics being gathered on each of the target blobs. In the preferred embodiment of the invention there are 10 blob statistics being collect on each of the targets. The statistics are accessed as part of one memory location. This way the statistics are updated on each pixel clock.

The bounding edges for a blob, the blob location with respect to a particular pixel, and the blob location with respect to a particular line of the frame are examples of statistics gathered on each of the target blobs. In addition, the blob statistics maintained in blob statistics module 132 include the maximum intensity and minimum intensity pixels and the intensity sum of all target pixels. Blob statistics are maintained for all blobs where the pixels are next to or adjacent each other. This includes pixels which are adjacent in a horizontal direction, in a vertical direction and diagonally.

The statistics maintained in blob statistics module 132 are listed below for bits 0 . . . 127.

0—bits 7 . . . 0 are minimum pixel intensity in a target.
1—bits 15 . . . 8 are maximum pixel intensity in a target.
2—bits 23 . . . 16 are minimum target pixel position on line, X.
3—bits 31 . . . 24 are maximum target pixel position on line, X.
4—bits 39 . . . 32 are minimum target pixel position on line, Y.
5—bits 47 . . . 40 are maximum target pixel position on line, Y.
6—bits 67 . . . 48 are the number of pixels in a target.
7—bits 87 . . . 68 are the intensity sum of target pixels.
8—bits 107 . . . 88 are the sum of all target X positions.
9—bits 127 . . . 108 are the sum of all target Y positions.

The blob statistics for minimum pixel intensity are found by comparing four inputs to the statistics register 132. The four inputs are mem1_in[7 . . . 0], mem2_in[7 . . . 0], data[7 . . . 0] and current value in the blob statistics.

Similarly, the blob statistics for maximum pixel intensity are found by comparing four inputs to the statistics register 132. The four inputs are mem1_in[15 . . . 8], mem2_in[15 . . . 8], data[7 . . . 0] and current value in the blob statistics.

The blob statistics for minimum x position, maximum x position, minimum y position, and maximum y position are also found by examining the inputs mem1_in[127 . . . 0], mem2_in[127 . . . 0], pixel[7 . . . 0] of register 132 and current data bits for each statistic. These bits are bits 23 . . . 16, bits 31 . . . 24, bits 39 . . . 32 and bits 47 . . . 40.

The statistics register 132 also counts the number of pixels in the current target, sums the intensity of the pixels in the current target, sums the x position of the pixels in the current target, and sums the y position of the pixels in the current target.

The blob statistics which are stored are maximum/minimum target intensity, bounding dimensions of a target group, number of pixels, average intensity of the pixels for the target and the centroid for a target. The statistics are maintained in parallel so that a viewer can view the statistics at one given time period.

The blob statistics module 132 outputs bits 0 . . . 127 to the statistics memory 142. Statistics memory 142 is a 256 word random access memory which allows the statistics for each blob group to be stored in one location in memory. This single location memory feature of statistics memory 142 also allows the statistics for each blob group to be updated on each pixel cycle. Pixel data transfers occurs when there are no target pixels that meet the threshold requirements contained in the thresh_low[7 . . . 0] and thresh_high[7 . . . 0] input to blob controller 128. The use of the single memory location corresponds to the memory location for each of the blob groups.

The memory pointers module 136 provides memory pointers in hardware to keep track of overlapping target blobs. The memory pointers are stored in memory pointer registers so that the memory pointers can be checked and then updated in parallel. When a target is found to be overlapping, the memory pointers are checked each pixel cycle to see if the pixel's value needs to be updated.

Each pointer location is used only when a blob is found to be overlapping with another blob. The memory pointers can be reused if the pointers were not active for the last two lines of a video frame.

Each entry for a memory pointer requires a cell which is 16-bits. The lower 8-bits of the cell is the index and the upper 8-bits of the cell is the pointer location. A generate statement is used to create all of the memory pointer registers.

The memory pointers point to updated track files as the track files are combined. If multiple track files are combined memory pointers module 136 keeps all of the memory pointers up to date. If there are no memory pointers for a given blob there has not been a prior attempt to combine the blob with another blob.

There are also two index inputs to the memory pointer module 136. The index inputs for pointer module 136 are indexa[7 . . . 0] and indexb[7 . . . 0]. Both indexes are active, but an update only occurs on index A. If there is no match on the index input, the input index is output on the memory address, which are mem_adda[7 . . . 0] and memaddb[7 . . . 0]. This module 136 can be updated to look and see if a pointer is used over the last two lines. If not the pointer can be reused.

When there are no pointers for a blob group, the memory pointers module 136 will return the given blob address. The first time a blob group is combined with another blob group a new pointer is generated by memory pointers module 136. Blob groups are only combined when they are adjacent each other. This combination of blob groups one and two is the second blob track.

When the previously combined blob groups (blob groups one and two) are combined with a third blob group, the pointer for the previously combined blob groups (blob groups one and two) is updated. This pointer also contains the original target ID number.

A new pointer is also created for this combined group (blob groups one, two and three). Both pointers, i.e. the pointer for the combination of blob groups one and two and the pointer for blob groups one, two and three are updated to point this newly combined blob group which is the third blob track.

When the third blob track is combined with still another blob group a fourth blob track is created which consist of the combination of the first and second blob groups, the combination of the first, second and third blob group and the fourth blob group. This also requires the creation of a new pointer by the memory pointers module 136 and an update of the pointers. This process will continue with tracks being identified as the fifth blob track, sixth blob track . . . $n^{th}$ blob track.

The statistics memory 142 is emptied or zeroed to indicate that previously formed blob group is no longer valid when a new blob group is formed. For example, when the third blob track was formed, the memory was emptied with respect to the combination of the first and second blob groups.

When a blob was previously combined with another blob, the memory pointers module will return the combined blob address. Each memory pointer contains the original blob address and a new pointer address for the combined blob groups.

When an update command is generated by the blob controller 128, if there is not a pointer for the combined blob address a new pointer is created. For subsequent blob combinations when there is an existing pointer the pointer module 136 will update the pointer to a new blob address.

When there are multiple pointers, each pointer is updated. All of the pointers are updated on each clock to account for nesting.

Circuit 120 includes software which combines target blobs in real time. A dual threshold 122 is used to combine targets consisting of an upper boundary thresh_high[7 . . . 0] and a lower boundary thresh_low[7 . . . 0]. The boundaries use equal values, so a single level search may be performed. This allows a user to select a range of intensities which define a target or blob.

There are two limitations to the design circuit 120: (1) Memory for track files; and (2) Registers for indirect track calculations. These two values are output at the end of a frame to allow the user to determine the appropriate amount of resources to set for these two functions. Both of these functions are external to the software for blob controller 128.

The software looks at a pixel and its four neighboring pixels to determine the function. The software considers any touching pixel to be of the same target. This includes diagonal pixels and pixels directly above the pixel on the previous line. Shown below are the pixel combinations processed by blob controller 128.

| XXX LL | do nothing | Case 0 |
|---|---|---|
| XXX HL | write target data | Case 1 |
| LLL LH | create new track | Case 2 |
| LLL HH | update track | Case 3 |
| HLL HHL HHH LH LH LH | sum last line | Case 4 |
| LHL LHH LH LH | sum last line | Case 5 |
| LLH LH | sum last line | Case 6 |
| HLL HHL HHH HH HH HH | sum last line | Case 7 |
| LHL LHH HH HH | sum last line | Case 8 |

X - don't care
L - pixel not within threshold
H - pixel within threshold
- track number The special cases below occur where multiple tracks need to be combined, if the target types are different.

| LL1 2H | Combine if 1 & 2 diff | Case 9 |
|---|---|---|
| 1L2 1H | Combine if 1& 2 diff | Case 10 |
| 1L2 LH | Combine if 1& 2 diff | Case 11 |

Pixels are processed by blob controller 128 in accordance with the above cases in groups of five or increments of five pixels, where three of the pixels are from the previous line of pixel data and two pixels are from the present line of pixel data being processed.

There are a total of 32 possible combinations of five pixels which can be processed by the blob controller 128. A number of the combinations are not processed by the blob controller 128. For example, if there are no target pixels on the current line being processed, blob controller 128 ignores the pixels on the current line irregardless of the target pixels on the previous line.

For example, in case one the first pixel in the second line of the group is within the intensity threshold and is thus a blob pixel. In case one, the blob pixel relating to this group is written to the memory within blob controller 128.

In case two, there are five pixels one of which is within the intensity threshold 122 supplied to blob controller 128. The location of this blob pixel, which is the second pixel in the second line, will result in the creation of a new track file or new blob group.

In case three, two adjacent or touching pixels on the second line of the group are within intensity threshold 122. This results in an update to the track file by blob controller 128.

In cases four, five, six, seven and eight, the blob controller 128 sums the last line of the frame. The blob controller combines pixel groups in cases nine, ten and eleven.

There are two timing steps to this design due to registered memory. There is a two and three clock delay processes.

In processing the incoming video data 124, the blob controller 128 determines when a pixel is a blob pixel, and creates new blob groups.

Analysis of video data 124 is on a pixel by pixel basis. The blob controller 128 first determines if pixel intensity is within the desired thresholds provided by threshold input 122. The threshold input 122 consist of an upper boundary thresh_high[7 . . . 0] and a lower boundary thresh_low[7 . . . 0]. If a pixel is within the thresholds 122, then blob controller 128 tags the pixel as a blob pixel.

If this pixel is the first blob pixel within the video data being processed, then a new blob group is created by blob controller 128. If a previous pixel or the pixels above it on the previous line of a video data are blob pixels, then the pixel is grouped with the previous pixels or the pixels above it by blob controller 128.

The blob controller 128 uses pipelining which allows the user to view five pixel data in parallel. Blob controller 128 also loads statistics from the previous line so that these statistics are available for combining with the present line. The blob controller 128 determines if pixel intensity for the pixel currently being processed is within the preset threshold range for target pixels. The blob controller 128 analyzes pixel data on a pixel by pixel basis to determine when and how pixel groups are to be combined. The blob controller 128 also controls the writing of pixel statistics data to memory 142.

Referring to FIGS. 1, 2A, 2B, 2C, 2D and 2E, blob controller 128 receives the low and high intensity thresholds for blob pixel identification at its thl[7 . . . 0] and thh[7 . . . 0] inputs. The eight bit intensity thresholds are generated externally. In addition, the clock signal for the blob controller 128 is provided by a clock oscillator and the clear signal for the blob controller 128 is a power up externally generated signal. The clock signal is supplied to the clk input of blob controller 128, while the clear signal is supplied to the aclr input of blob controller 128.

Each eight bit word provided to the pixel[7 . . . 0] input of blob controller 128 indicates a location for the pixel on the line within the raster of video data currently being processed. Each eight bit word provided to the line[7 . . . 0] indicates the line number for the line within the raster of video data currently being processed. Each eight bit word supplied to the video[7 . . . 0] input of blob controller 128 provides an indication of the intensity level of the pixel being processed.

Each of the three eight bit words which provide pixel location on each line, line position which is the line the pixel is located on, and video intensity level, are generated by the frame timing module 126. The frame timing module 126 also generates an enable signal which is supplied to the enable input of blob controller 128 indicating to blob controller 128 that the video data is valid video data. The end of line signal and end of frame signal generated by the frame timing module 126 indicates to the blob controller 126 the location within the frame of the video data currently being processed. These signals are supplied to end_line and end_frame inputs of blob controller 128 by frame timing module 126.

The mem_in[127 . . . 0] input of controller 128 receives stored statistics data from statistics memory 142 via a transmission line 148. Blob statistics from blob statistics module 132 are transmitted to the stat_reg[127 . . . 00] input of blob controller 128 via transmission line 140. The last_fifo_in[23 . . . 0] input for controller 128 receives target data input from the last line memory module 138 via transmission line 146.

There is also a flag from last line memory module 138 which is supplied to the last_fifo_empty of blob controller 128. This flag indicates that the last line memory is empty.

Blob controller 128 outputs control signals to the blob statistics module 132. The signal output from the reg_sclr output instructs the blob statistics module 132 to clear statistics stored within module 132. The signal output from the reg_en output instructs module 132 to enable the blob statistics module to sum data with the current pixel being processed. The signal output from the mem_zero output instructs the statistics module 140 to output zeros to the memory module 142. This is utilized to clear old blob memory when two blobs are combined insuring that cleared portion of the memory is empty.

The signals output from reg_mem1_en and reg_mem2_en of controller 128 along with the signal output from reg_en of controller 128 are used when pixel groups are combined. These signals allow for the handling and processing by module 132 of multiple inputs of pixel groups supplied to module 132 by blob controller 128.

Blob controller 128 receives the pixel location, line position and video intensity level data from frame timing module 126. Blob controller 128 then delays the pixel location, line position and video intensity level data prior to providing the data to the video_out, pixel_out and line_out outputs of blob controller 128. The pixel location, line position and video intensity level data is then supplied to the pixel[7 . . . 0], line[7 . . . 0] and data[7 . . . 0] inputs of blob statistics module 132. As previously discussed, blob statistics module 128 can then process multiple inputs of pixel groups with the reg_mem1_en, reg_mem2_en and reg_en signals controlling the process for combining the pixels groups.

The video_out, pixel_out and line_out data are included in the statistics stored in memory 142. This data provides the bounding pixels for a blob including line location, pixel location and intensity.

The q[127 . . . 0] output of statistics memory 142 which the statistics data from memory 127 is provided to the mem_in [127 . . . 0] input of blob controller 128. The mem_out[127 . . . 0] output of blob statistics module 132 is connected to the stat_reg[127 . . . 0] input of blob controller 128.

Reg_mem1_en is an output from controller 128 to the blob statistics module 132 which is a memory out of the statistics memory 142. Reg_mem2_en is an output from controller 128 to the blob statistics module 132 which is the memory combined output from the blob controller 128.

Mem_waaddr[7 . . . 0] and Mem_wraddr[7 . . . 0] from controller 128 provide addresses for writing statistics data into and reading statistics data from statistics memory 142. Mem_wren and mem_rden from controller 128 provide write and read enables for statistics memory 142.

Update and pointer[7 . . . 0] from controller 128 are utilized by pointer module 136 to point to the updated track files as track files are combined. When multiple track files are combined the pointer module 136 keeps all of the pointers up to date. Specifically, the update signal updates the given index and pointer and the 8-bit pointer is the pointer to the correct track. Update from controller 128 provides the update command which is supplied to the update input for memory pointers module 136.

The last_line_out output from controller 128 supplies the start pixel, end pixel and the target ID number for each line of pixel data to the data[23 . . . 0] input of last line memory 138. As each line of pixel data is processed, the start pixel, end pixel and the target/blob ID number data stored in memory and then written out to the last line memory 138. The blob controller also provides a read signal to memory 138 and a write signal to memory 138, which last_rd_en and last_wr_en, respectively. For each line of a frame the first and last pixels for each blob group are flagged and written to a last line memory.

The data_out[19 . . . 0] of controller 128 is output data at the end of a frame, tar_type[3 . . . 0] of controller 128 is an output to monitor target ID type and test_out of controller 128 is for testing.

Figure 2A:
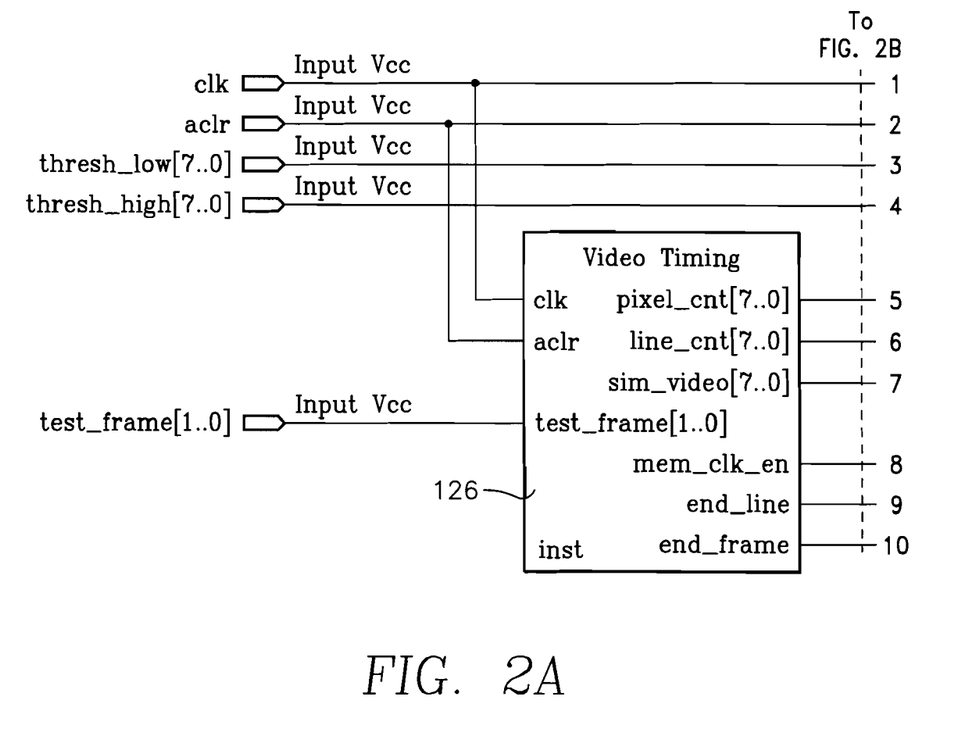
FIGS. 2A-2E are a detailed electrical schematic diagram of the circuitry used to implement the apparatus of FIG. 1.
Figure 2B:
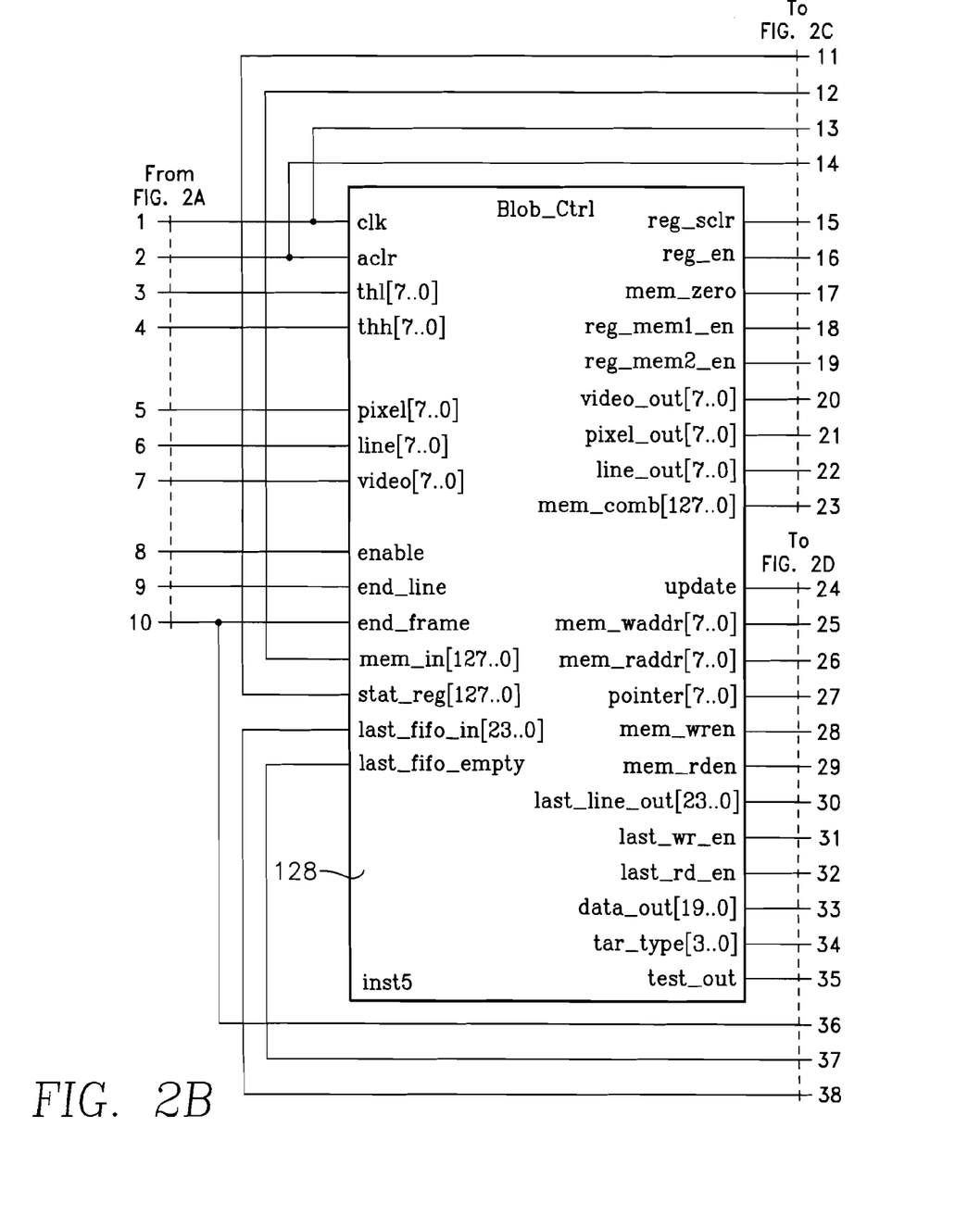
Figure 2C:
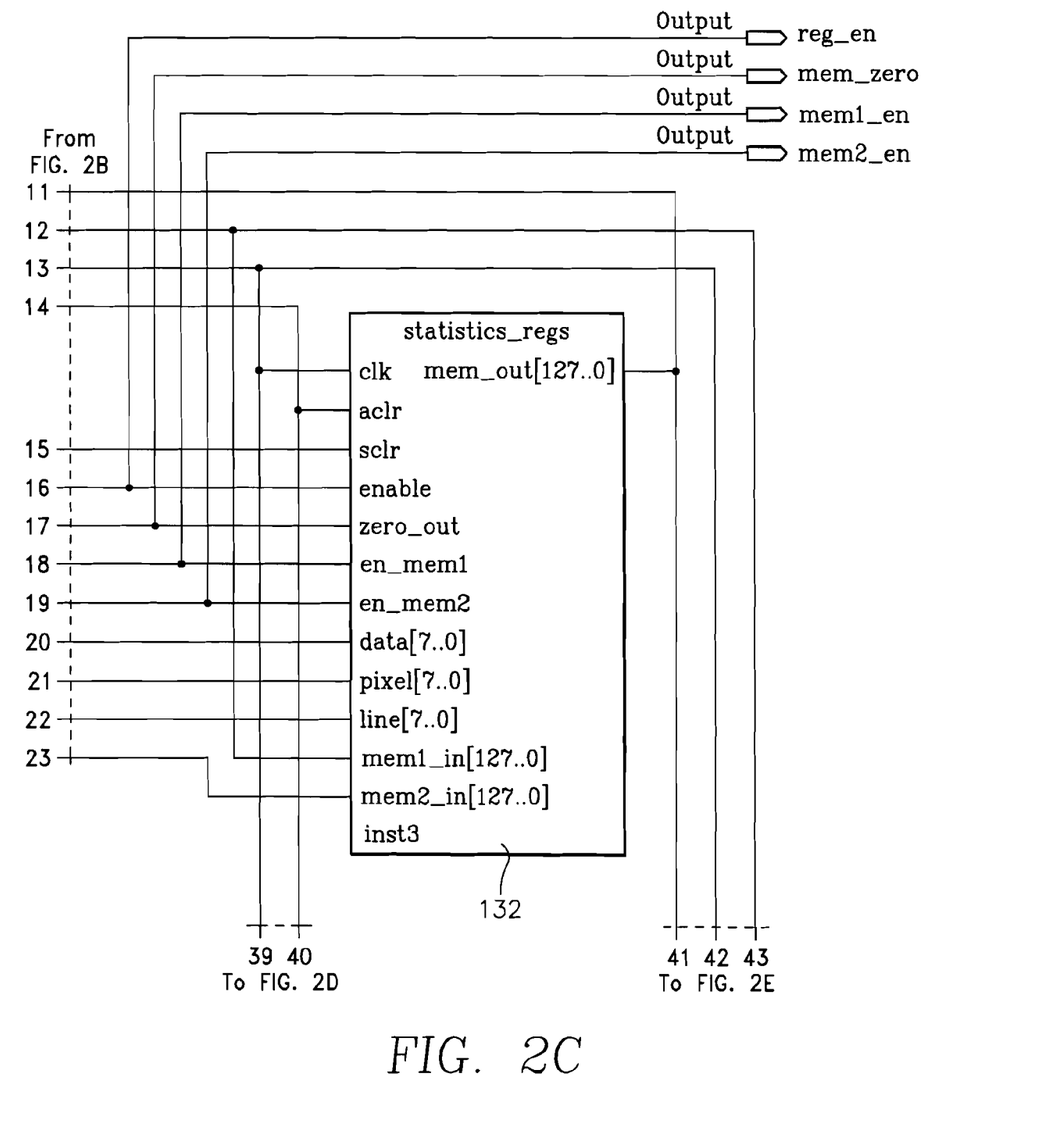
Figure 2D:
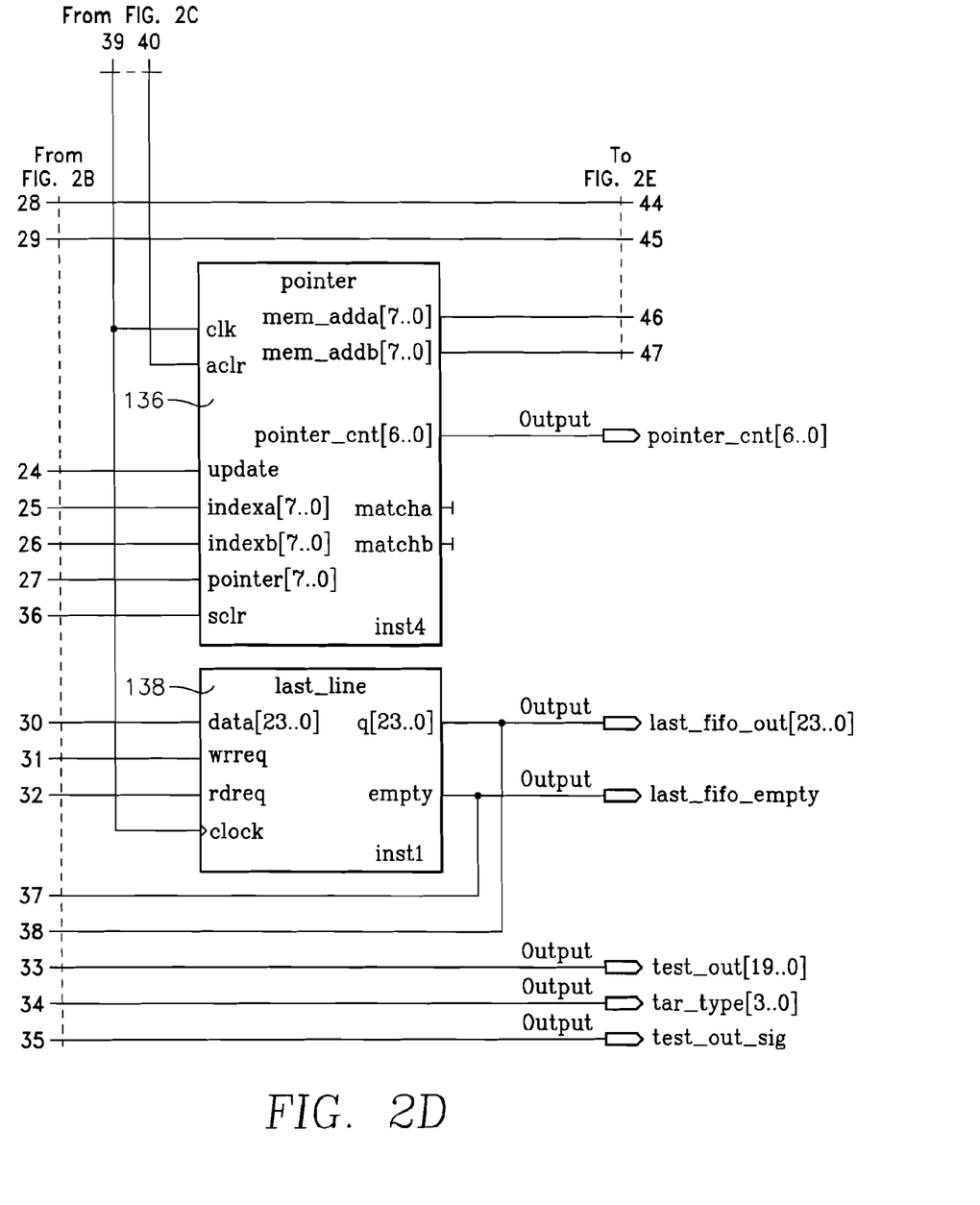
Figure 2E:
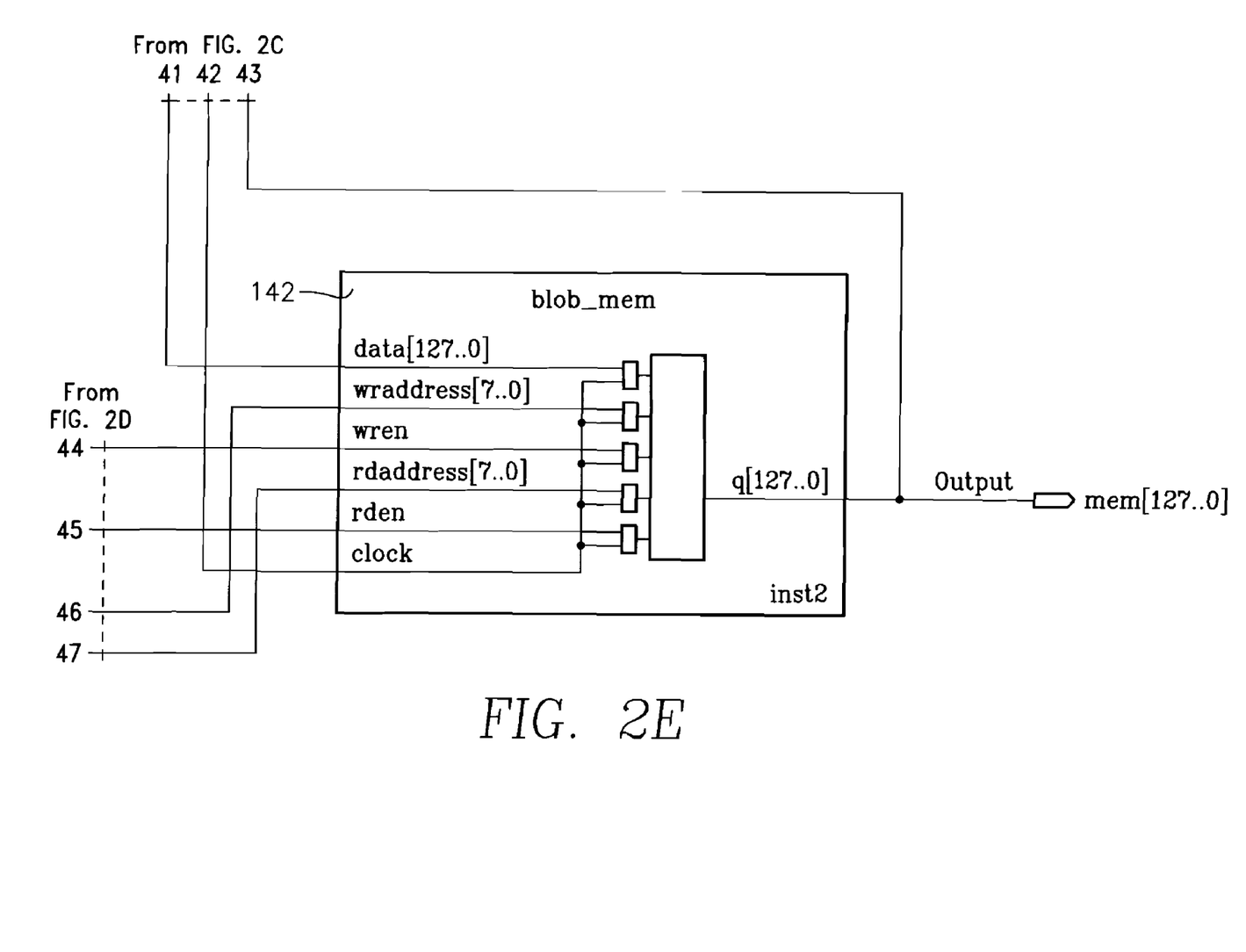

Referring to FIGS. 2B and 2C, indexa[7 . . . 0] for pointers module 136 is a write address, indexb[7 . . . 0] for pointers module 136 is a read address and pointer[7 . . . 0] is new index used for updating. Pointer_cnt[6 . . . 0] is a counter which monitors the number of pointers being used.

If there is not a pointer for indexa, the address is passed through mem_adda[7 . . . 0] output of pointers module 136 to statistics memory 142. Similarly, if there is not a pointer for indexb, the address is passed through mem_addb[7 . . . 0] output of pointers module 136 to statistics memory 142.

The blob controller 128 also includes a state machine. The state machine is designed to output pixel data from the dual port memory at the end of the frame of data currently being processed. The data is output via the q[127 . . . 0] output of memory 142 as eight words of data. Each word includes sixteen bits. The first word is zero while the memory is read. The pixel data output from memory 142 may be written into an external FIFO memory and then a digital computer for processing by the computer.

What is claimed is:

1. A method for processing frames of video data which include high resolution blob groups representing a plurality of targets, said method comprising the steps of:
   (a) receiving said frames of video data from an external source;
   (b) providing for two dimensional processing of each of said frames of video data so as to define a pixel location for each of a plurality of pixels contained within said frame of video data currently being analyzed;
   (c) providing logic signals which indicate an end of a line of video data and an end of the frame of video data currently being analyzed;
   (d) processing each of said frames of video data including the pixel location for each pixel within the frame of video data, and the logic signals which indicate the end of said line of video data and the end of said frame of video data currently being analyzed;
   (e) determining when each of said pixels within the frame of video data currently being analyzed is a blob pixel which indicates the presence of one target within said frame of video data;
   (f) processing said plurality of pixels including said blob pixels in said frame of video data in groups of five pixels wherein three pixels are from a previous line of video data which has been processed and two pixels are from a present line of video data which is currently being processed;
(g) determining when each of the groups of five pixels comprises a blob group representing a new target different from said targets previously identified;
(h) determining when a pair of said blob groups include an overlapping pixel which overlaps the pair of said blob groups so as to allow the pair of said blob groups to be combined;
(i) combining each pair of said blob groups when a determination is made that the pair of said blob groups are combinable;
(j) storing each of said blob groups and combined blob groups at a separate location in a statistics memory; and
(i) generating a plurality of memory pointers, wherein each of said memory pointers point to the separate location in said statistics memory of one of said combined blob groups.

2. The method of claim 1 further comprising the step of storing in a last line memory a first pixel and a last pixel for each of said blob groups within each of said lines of video data in said frame of video data currently being analyzed and a target identification for each said blob groups.

3. The method of claim 1 further comprising the steps of:
(a) generating a plurality of control signals including register memory one and register memory two enable signals; and
(b) providing said plurality of control signals to a statistics register, said statistics register, responsive to said register memory one and register memory two enable signals and said register memory enable signal, combining each pair of said blob groups that are combinable.

4. The method of claim 1 further comprising the steps of:
(a) providing a pair of pixel intensity level digital signals from said external source which include an eight bit upper boundary threshold high word and an eight bit lower boundary threshold low word, wherein said external source provides said pair of external signals; and
(b) utilizing said pair of pixel intensity level digital signals to locate the presence of said blob pixels within the frame of video data currently being analyzed, wherein said blob controller utilizes said pair of pixel intensity level digital signals to locate the presence of said blob pixels within the frame of video data currently being analyzed.

5. A method for processing frames of video data which include high resolution blob groups representing a plurality of targets, said method comprising the steps of:
(a) receiving said frames of video data from an external source, wherein a frame timing module receives said frames of video data;
(b) providing for two dimensional processing of each of said frames of video data which allows said frame timing module to define a pixel location for each of a plurality of pixels contained within said frame of video data currently being analyzed;
(c) providing logic signals which indicate an end of a line of video data and an end of the frame of video data currently being analyzed, wherein said frame timing module provides said logic signals;
(d) processing each of said frames of video data including the pixel location for each pixel within the frame of video data, and the logic signals which indicate the end of said line of video data and the end of said frame of video data currently being analyzed, wherein a blob controller processes each of said frames of video data;

(e) determining when each of said pixels within the frame of video data currently being analyzed is a blob pixel which indicates the presence of one target within said frame of video data;
(f) processing said plurality of pixels including said blob pixels in said frame of video data in groups of five pixels wherein three pixels are from a previous line of video data processed by said blob controller and two pixels are from a present line of video data currently being processed by said blob controller;
(g) determining when each of the groups of five pixels comprises a blob group representing a new target different from said targets previously identified;
(h) determining when a pair of said blob groups include an overlapping pixel which overlaps the pair of said blob groups so as to allow the pair of said blob groups to be combined, wherein said blob controller performs steps (e), (f), (g) and (h);
(i) combining each pair of said blob groups when said blob 1 controller determines the pair of said blob groups are combinable, wherein a statistics register combines said pair of blob groups;
(j) storing each of said blob groups and combined blob groups at a separate location in a statistics memory; and
(i) generating a plurality of memory pointers, wherein each of said pointers generated by a memory pointers module point to the separate location in said statistics memory of one of said combined blob groups.

6. The method of claim 5 further comprising the step of storing in a last line memory a first pixel and a last pixel for each of said blob groups within each of said lines of video data in said frame of video data currently being analyzed and a target identification for each said blob groups.

7. The method of claim 5 further comprising the steps of:
(a) generating a plurality of control signals including register memory one and register memory two enable signals wherein said blob controller generates said plurality of control signals; and
(b) providing said plurality of control signals to said statistics register, said statistics register, responsive to said register memory one and register memory two enable signals and said register memory enable signal, combining each pair of said blob groups that are combinable.

8. The method of claim 5 further comprising the steps of:
(a) providing a pair of pixel intensity level digital signals from said external source which include an eight bit upper boundary threshold high word and an eight bit lower boundary threshold low word, wherein said external source provides said pair of external signals; and
(b) utilizing said pair of pixel intensity level digital signals to locate the presence of said blob pixels within the frame of video data currently being analyzed, wherein said blob controller utilizes said pair of pixel intensity level digital signals to locate the presence of said blob pixels within the frame of video data currently being analyzed.

9. The method of claim 5 further comprising the steps of generating a plurality of statistics forming a 128 bit word for each one of said targets comprising said plurality of statistics for said target:
(a) wherein bits 7 . . . 0 of said 128 bit word comprise a minimum pixel intensity for said target;
(b) bits 15 . . . 8 of said 128 bit word comprise a maximum pixel intensity for said target;
(c) bits 23 . . . 16 of said 128 bit word comprise a minimum X coordinate position for said target within said frame;

(d) bits 31 ... 24 of said 128 bit word comprise a maximum X coordinate position for said target within said frame;
(e) bits 39 ... 32 of said 128 bit word comprise a minimum Y coordinate position for said target within said frame;
(f) 47 ... 40 of said 128 bit word comprise a maximum Y coordinate position for said target within said frame;
(g) bits 67 ... 48 of said 128 bit word comprise the number of pixels in said target;
(h) bits 87 ... 68 of said 128 bit word comprise an intensity of the pixels of said target;
(i) bits 107 ... 88 of said 128 bit word comprise a sum for target X coordinate positions for said target; and
(j) bits 127 ... 108 of said 128 bit word comprise a sum for target Y coordinate positions for said target.

10. The method of claim 9 further comprising the step of comparing pixel data which is input to said statistics register by said blob controller, and said statistics memory and currently resides in said statistics register to calculate said minimum pixel intensity, said maximum pixel intensity, said minimum X coordinate position, said maximum X coordinate position, said minimum Y coordinate position and said maximum Y coordinate position for said target.

11. The method of claim 10 further comprising the steps of:
(a) counting the number of pixels in each of said targets to determine the number of pixels contained within each of said targets; and
(b) summing the intensity of the pixels in each of said targets to determine the intensity sum of the pixels in each of said targets.

12. The method of claim 7 further comprising the step of setting pixel information to zero for one of said blob groups when said blob groups are combined to indicate that said blob group is no longer a valid blob group.

13. A method for processing frames of video data which include high resolution blob groups representing a plurality of targets, said method comprising the steps of:
(a) receiving said frames of video data from an external source, wherein a frame timing module receives said frames of video data;
(b) providing for two dimensional processing of each of said frames of video data which allows said frame timing module to define a pixel location for each of a plurality of pixels contained within said frame of video data currently being analyzed;
(c) providing logic signals which indicate an end of a line of video data and an end of the frame of video data currently being analyzed, wherein said frame timing module provides said logic signals;
(d) processing each of said frames of video data including the pixel location for each pixel within the frame of video data, and the logic signals which indicate the end of said line of video data and the end of said frame of video data currently being analyzed, wherein a blob controller processes each of said frames of video data;
(e) determining when each of said pixels within the frame of video data currently being analyzed is a blob pixel which indicates the presence of one target within said frame of video data;
(f) processing said plurality of pixels including said blob pixels in said frame of video data in groups of five pixels wherein three pixels are from a previous line of video data processed by said blob controller and two pixels are from a present line of video data currently being processed by said blob controller;
(g) determining when each of the groups of five pixels comprises a blob group representing a new target different from said targets previously identified;
(h) determining when a pair of said blob groups include an overlapping pixel which overlaps the pair of said blob groups so as to allow the pair of said blob groups to be combined, wherein said blob controller performs steps (e), (f), (g) and (h);
(i) combining each pair of said blob groups when said blob controller determines the pair of said blob groups are combinable, wherein a statistics register combines said pair of blob groups;
(j) storing each of said blob groups and combined blob groups at a separate location in a statistics memory;
(k) generating a plurality of memory pointers, wherein each of said pointers, which are generated by a memory pointers module, point to the separate location in said statistics memory of one of said combined blob groups wherein said memory pointers module generates a new pointer for each of said combined blob groups when said blob groups are first combined by said statistics memory, said memory pointers module updating said pointers previously generated by said memory pointers module with current address information for said blob groups which are currently combined and include at least one previously combined blob group; and
(l) storing in a last line memory a first pixel and a last pixel for each of said blob groups within each of said lines of video data in said frame of video data currently being analyzed and a target identification for each said blob groups.

14. The method of claim 13 further comprising the steps of:
(a) generating a plurality of control signals including register memory one and register memory two enable signals wherein said blob controller generates said plurality of control signals; and
(b) providing said plurality of control signals to said statistics register, said statistics register, responsive to said register memory one and register memory two enable signals and said register memory enable signal, combining each pair of said blob groups that are combinable.

15. The method of claim 13 further comprising the steps of:
(a) providing a pair of pixel intensity level digital signals from said external source which include an eight bit upper boundary threshold high word and an eight bit lower boundary threshold low word, wherein said external source provides said pair of external signals; and
(b) utilizing said pair of pixel intensity level digital signals to locate the presence of said blob pixels within the frame of video data currently being analyzed, wherein said blob controller utilizes said pair of pixel intensity level digital signals to locate the presence of said blob pixels within the frame of video data currently being analyzed.

16. The method of claim 13 further comprising the steps of generating a plurality of statistics forming a 128 bit word for each one of said targets comprising said plurality of statistics for said target:
(a) wherein bits 7 ... 0 of said 128 bit word comprise a minimum pixel intensity for said target;
(b) bits 15 ... 8 of said 128 bit word comprise a maximum pixel intensity for said target;
(c) bits 23 ... 16 of said 128 bit word comprise a minimum X coordinate position for said target within said frame;
(d) bits 31 ... 24 of said 128 bit word comprise a maximum X coordinate position for said target within said frame;
(e) bits 39 ... 32 of said 128 bit word comprise a minimum Y coordinate position for said target within said frame;
(f) bits 47 ... 40 of said 128 bit word comprise a maximum Y coordinate position for said target within said frame;

(g) bits 67 . . . 48 of said 128 bit word comprise the number of pixels in said target;

(h) bits 87 . . . 68 of said 128 bit word comprise an intensity sum of the pixels of said target;

(i) bits 107 . . . 88 of said 128 bit word comprise a sum for target X coordinate positions for said target; and (j) bits 127 . . . 108 of said 128 bit word comprise a sum for target Y coordinate positions for said target.

17. The method of claim 16 further comprising the step of comparing pixel data which is input to said statistics register by said blob controller, and said statistics memory and currently resides in said statistics register to calculate said minimum pixel intensity, said maximum pixel intensity, said minimum X coordinate position, said maximum X coordinate position, said minimum Y coordinate position and said maximum Y coordinate position for said target.

18. The method of claim 17 further comprising the steps of:
(a) counting the number of pixels in each of said targets to determine the number of pixels contained within each of said targets; and
(b) summing the intensity of the pixels in each of said targets to determine the intensity sum of the pixels in each of said targets.

19. The method of claim 14 further comprising the step of setting pixel information to zero for one of said blob groups when said blob groups are combined to indicate that said blob group is no longer a valid blob group.

* * * * *